United States Patent
Dunagan et al.

(10) Patent No.: US 7,155,420 B2
(45) Date of Patent: Dec. 26, 2006

(54) BOOSTED PERCEPTRON

(75) Inventors: John Dunagan, Sammamish, WA (US); Santosh S. Vempala, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 610 days.

(21) Appl. No.: 10/426,669

(22) Filed: Apr. 30, 2003

(65) Prior Publication Data

US 2004/0220987 A1 Nov. 4, 2004

(51) Int. Cl.
*G06F 17/00* (2006.01)

(52) U.S. Cl. .......................... 706/15; 706/17; 706/19; 706/21; 708/446

(58) Field of Classification Search .................... 706/1, 706/10, 14, 15, 17, 19, 932; 708/1–9, 100, 708/200, 205, 207–209, 274, 308, 400, 401, 708/424, 440, 441, 446, 513, 514, 800
See application file for complete search history.

(56) References Cited

U.S. PATENT DOCUMENTS 6,571,227 B1 * 5/2003 Agrafiotis et al. ............ 706/15
6,865,562 B1 * 3/2005 Fromherz et al. ............. 706/14
6,912,515 B1 * 6/2005 Jackson et al. ............... 706/19

OTHER PUBLICATIONS

Cristianini et al, "An Introduction to Support Vector Machines", Mar. 2000, pp. 9-25, 79-92.*
Saad et al., "GMRES: A Generalized Minimal Residual Algorithm For Solving Nonsymetric Linear Systems", Jul. 1986, pp. 856-869.*

* cited by examiner

*Primary Examiner*—Joseph P. Hirl
*Assistant Examiner*—Omar Fernández Rivas
(74) *Attorney, Agent, or Firm*—Lee & Hayes, PLLC (57) ABSTRACT

In one embodiment, a system and method for solving linear programs includes a perceptron algorithm configured to move toward a solution to the linear program. A transform algorithm is configured to stretch portions of a vector space within which the linear program is defined. A decision module decides between continued application of the perceptron algorithm and application of the transform algorithm based on a rate at which the approximate solutions are approaching a satisfactory solution.

83 Claims, 4 Drawing Sheets

| 104 REFORMULATION MODULE |
| --- |
| 302 REFORMULATION FUNCTION |
| 304 REFORMULATION FUNCTION |

112 TRANSFORMATION MODULE

702 TRANSFORMATION FUNCTION

704 TRANSFORMATION FUNCTION

Fig. 7

BOOSTED PERCEPTRON

TECHNICAL FIELD

A boosted perceptron algorithm to solve a linear program includes application of a perceptron algorithm, alternated with a transformation within a vector space in which the linear program is defined, wherein the transformation is calculated to accelerate the progress of subsequent application of the perceptron algorithm.

BACKGROUND

Linear programs are a mathematical formulation of problems, such as resource allocation. Resource allocation issues are extremely widespread, and can be found in manufacturing, services, construction, computer network management and many other areas. Accordingly, intense research activity has been devoted to developing algorithms to solve linear programs, and several major steps forward have been made. In particular, the Simplex method developed in 1947 and the more recent Perceptron method have achieved some success in providing solutions.

However, when applied to some linear programming applications, known methods may encounter circumstances in which progress toward a solution is slowed or prevented. Additionally, use of known methods may result in degraded performance due to the size of some linear programs, which may involve hundreds of thousands of variables and constraints. Accordingly, more advanced linear programming algorithms are needed, which will provide solutions when existing methods result in failure or delay.

SUMMARY

In one embodiment, a system and method for solving linear programs includes a perceptron algorithm configured to move toward a solution to the linear program. A transform algorithm is configured to stretch portions of a vector space within which the linear program is defined. A decision module decides between continued application of the perceptron algorithm and application of the transform algorithm based on a rate at which the approximate solutions are approaching a satisfactory solution.

BRIEF DESCRIPTION OF THE DRAWINGS

The following detailed description refers to the accompanying figures. In the figures, the left-most digits(s) of a reference number identifies the figure (FIG.) in which the reference number first appears. Moreover, the same reference numbers are used throughout the drawings to reference like features and components.

DETAILED DESCRIPTION

Figure 1:
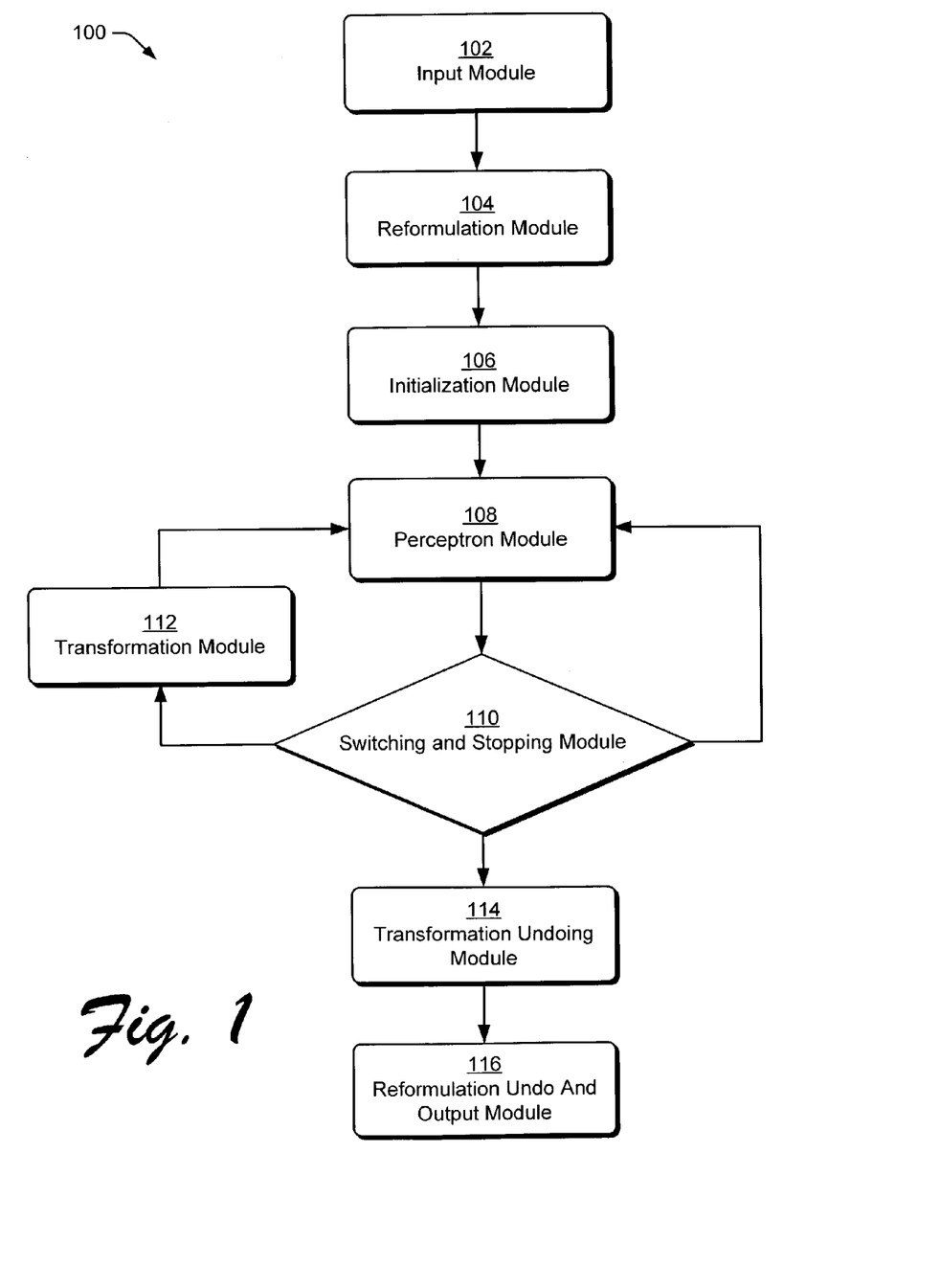
FIG. 1 is an illustration showing the operation of an exemplary boosted perceptron system.

FIG. 1 is an illustration showing the structure and operation of an exemplary Boosted Perceptron system 100. The structure and method of operation of the Boosted Perceptron system 100 may be implemented by any desired means, such as by the execution of processor-readable instructions defined on a processor-readable media, such as a disk, a ROM or other memory device, or by operation of an application specific integrated circuit (ASIC) or other hardware device.

An input module 102 is configured to receive a linear program, typically including a large number of equations and variables (i.e. equations and unknowns). The linear program may be have been generated initially by commercially available software configured to write down a linear program upon receipt of sufficient input data. The linear program may include m number of constraints and n number of variables. While the magnitude of m and n may vary considerably, an exemplary linear program may include thousands or hundreds of thousands of constraints and variables. Conceptually, the linear program may be defined as a polytope in a vector space having d dimensions, wherein the constraints are illustrated as hyperplanes.

Figure 2:
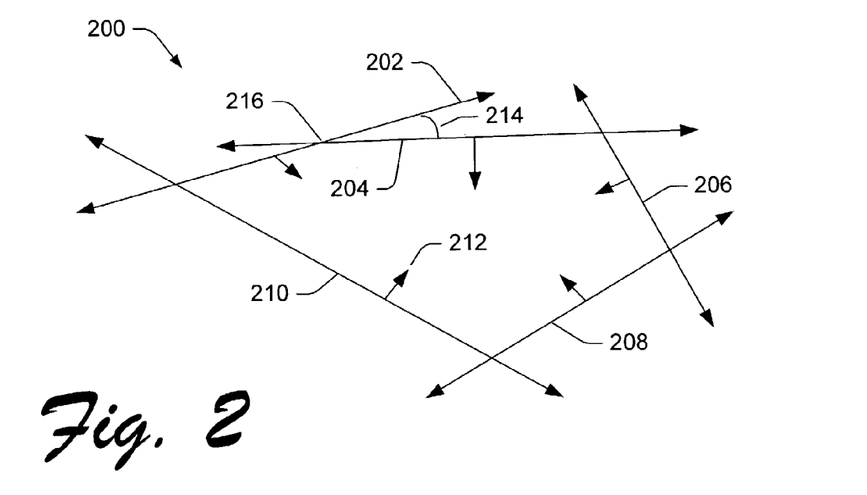
FIG. 2 is an illustration of an exemplary linear program.

An extremely simple linear program 200 is seen in FIG. 2, wherein hyperplanes representing constraints within the linear program are illustrated in two dimensional space by lines 202–210. Where the constraint lines represent equations with a "less than or equal to" symbol, the constraint includes an arrow 212, which indicates the side of the constraint which includes points not violating the constraint.

An acute angle 214 seen between two constraints 202, 204 may be sufficiently small as to cause a problem with conventional Perceptron methods. Additionally, a solution 216 to the linear program is illustrated at the intersection of two or more hyperplanes (illustrated in 2-D as lines).

Figure 3:
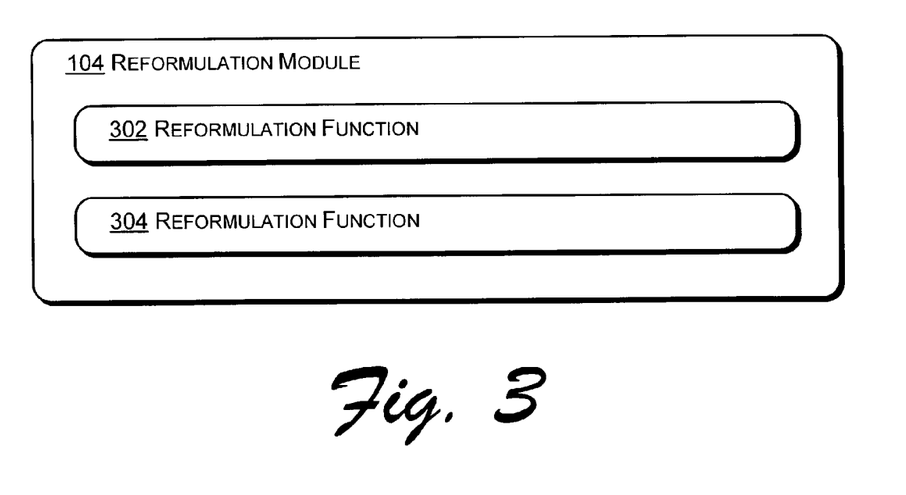
FIG. 3 is a block diagram illustrating in greater detail the elements of the reformation module seen in FIG. 1.

Continuing to refer to FIG. 1, a reformulation module 104 is configured to reformulate the linear program into a form expected by the boosted perceptron system 100. As seen in FIG. 3, the reformulation module 104 may include one or more reformulation functions, such as the reformulation functions 302, 304 illustrated for exemplary purposes. The first exemplary reformulation function 302 may be configured to reformulate the linear program into $\bar{A} x \geq 0$, $x_0 > 0$ form. In this form, $\bar{A}$ is an m by d matrix, wherein $\bar{a}_i$ refers to a single row of $\bar{A}$ and may be referred to as a constraint. A solution to the linear program is x, where $x_0 > 0$ prevents a trivial solution. The second exemplary reformulation function 304 may be configured to reformulate the linear program into $y^T \bar{A} = 0$, $y \geq 0$, $y_0 > 0$ form, and is mathematically similar.

Continuing to refer to FIG. 1, an initialization module 106 is configured to supply a starting guess as to the solution to the linear program. A variety of different initializations may result in satisfactory performance. In one exemplary embodiment, the starting guess may be x=[0, . . . 0, 1] (i.e., the $x_0$ coordinate is 1 and the rest of the coordinates are 0). The exemplary embodiment may let A=$\bar{A}$. A measure of the transforms applied to the problem by transform module 112 (as will be seen) is initialized; for example, where $x_{scaling}$ is used, $x_{scaling}$ is set to [0, . . . 0]; where B is explicitly stored, B is set to I (the identity matrix, a matrix with a diagonal column of 1s and the rest 0s).

Scalar values for $\sigma_{stopping}$, $\sigma_{scale\ in}$, and $\sigma_{scale\ out}$ may be selected, as desired. The scalar $\sigma_{stopping}$ determines the accuracy demanded in the final value of x. For example, depending on the formulation of the linear program coming out of the reformulation module 104, it may be the case that $a^T_i x \geq 0$ is desired. However, $(\overline{a}^T_i x)/(\|\overline{a}_i\| \|x\|) \geq -\sigma_{stopping}$ for all i may be satisfactory, where $\sigma_{stopping}$ is a small number, such as $10^{-10}$ and where $\overline{a}_i^T$ are transposed rows of $\overline{A}$. The scalar $\sigma_{scale\ in}$ determines how long the Perceptron module 108 operates before the transformation module 112 is invoked, and will always be less than $\sigma_{scale\ out}$. The scalar $\sigma_{scale\ out}$ determines how hard the transform step is pushed (i.e. the extent to which the vector space containing A and x is dilated). These values may be determined with minimal experimentation in most application settings. In most applications, the values will probably not change between runs of the algorithm, but rather will change between various problem domains. For example, when the boosted perceptron system 100 is applied to a telecommunication resource allocation problem it may use one value of $\sigma_{stopping}$; however, when the boosted perceptron system 100 is applied to another domain, such as airline crew scheduling, another value for $\sigma_{stopping}$ might be appropriate.

Figure 4:
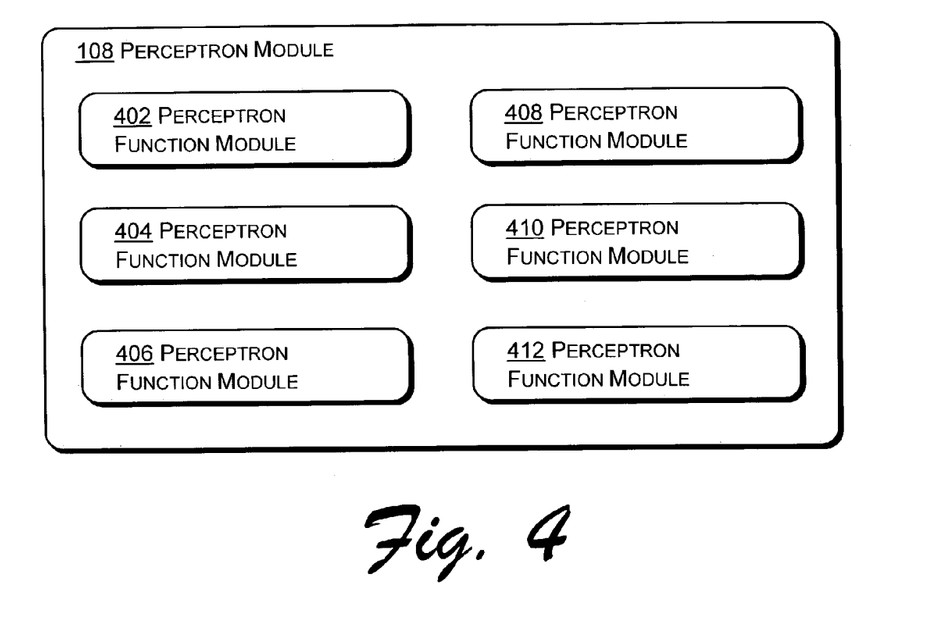
FIG. 4 is a block diagram illustrating in greater detail the elements of the perceptron module seen in FIG. 1.

A Perceptron module 108 is configured to move a vector x (or other symbol) toward a solution of a linear program, such as linear program 200 of FIG. 2, using an algorithm, such as a Perceptron algorithm or any other algorithm consistent with finding a solution to the linear program. An exemplary Perceptron module 108 may be configured in a variety of ways, due in part to the variety of available Perceptron algorithms. Moreover, the Perceptron module 108 may be configured to run algorithms that are not considered to be Perceptron algorithms in a classical sense, but which include algorithms which may be used to solve linear systems. Referring to FIG. 4, it can be seen that the Perceptron module 108 may be configured in a variety of ways, wherein perceptron function modules 402–412 illustrate several possible options from among those available. Perceptron function modules 402–412 therefore illustrate examples of specific implementations of possible Perceptron-type algorithms which are compatible with the system 100, but are not intended to represent an exhaustive survey of algorithms which may be utilized within the functional modules 402–412.

Perceptron module 108 shall be understood to work with the normalizations of the constraints $a_i$. The normalization of $a_i$ is $a_i/\|a_i\|$, and will be referred to as "the normalized constraint $a_i$".

Continuing to refer to FIG. 4, Perceptron functional module 402 is configured to operate according to a classic Perceptron algorithm. In operation, an $a_i$ is found which minimizes $a^T_i x$, where $a_i$ are normalized constraints within the linear program and where x is an approximate solution to the linear program. Using the $a_i$ discovered, the vector x approximating the solution to the linear program is set equal to $(x-(a^T_i x)a_i)$, where x is the previously used approximate solution.

Continuing to refer to FIG. 4, Perceptron functional module 404 is configured to include the Gauss-Seidel modification to the classic Perceptron algorithm. In Perceptron functional module 404, all i are considered sequentially, from 1 to m. In the case where $a^T_i x<0$, wherein m $a_i$ normalized constraints are included within the linear program, the vector x approximating the solution to the linear program is set to $(x-(a^T_i x)a_i)$, where x is the previously used approximate solution.

Continuing to refer to FIG. 4, Perceptron functional module 406 is configured to choose an $a_i$ based on a determination of a likelihood that the $a_i$ will be negative, where $a_i$ are normalized constraints within the linear program. Where $a^T_i x<0$, x is set equal to $(x-(a^T_i x)a_i)$, where x is the previously used approximate solution.

To decide which $a_i$ is most likely to result in a negative $a^T_i x$, the Perceptron functional module 406 may be configured to associate every constraint $a_i$ with a $p_i$, a non-negative priority. The $p_i$ may be kept in a randomized priority queue. Each constraint $a_i$ can be assigned a probability $p_i/(\Sigma\ p_i)$, where each $p_i$ may be initially set to have priority 1. In operation, where priority $p_i$ is not relevant because $a^T_i x/\|x\|>-\sigma_{scale\ in}$, then $p_i$ is multiplied by $\lambda$, otherwise $p_i$ is multiplied by $1/\lambda$. The value for $\lambda$ may be set at any desired value, but may be set advantageously at ½.

Continuing to refer to FIG. 4, Perceptron functional module 408 is configured to perform a modification to modules 402–406. The algorithm in Perceptron functional module 408 allows selection of a particular $a_i$ from among the $a_i$ representing normalized constraints within the linear program in any desired manner, such as those disclosed in the discussion of modules 402–406. Then, where $a_j$ is a normalized constraint used in the Perceptron step one prior to the current Perceptron step involving $a_i$, and where $a^T_j a_i<0$, the new selection for the vector x is set equal to $x-(((x^T a_i)-(a^T_i a_j)(x^T a_j))a_i+((x^T a_j)-(a^T_i a_j)(x^T a_i))a_j)/(1-(a^T_i a_j)^2)$, where x is the previously used approximate solution. Similarly, $a_j$ could be any normalized constraint satisfying $a^T_{j\ ai}<0$, e.g. $a_j$ could be two prior to $a_i$, although the constraint considered in the prior step is particularly likely to be a good choice.

Continuing to refer to FIG. 4, Perceptron functional module 410 is configured to perform a Perceptron algorithm based in part on an approximate Eigenvalue calculation. Such an algorithm may include one or several steps of an iterative method for solving the (possibly over or under constrained) linear system $\overline{A}x=0$, $\|x\|=1$. This is typically done by taking individual steps that minimize $x^T \overline{A}^T \overline{A}x/(x^T x)$, wherein the matrix $\overline{A}$ is formed by the normalized rows $a_i$ such $a^T_i x<0$, thereby implying that $a_i$ is a violated constraint for that value of i. This particular update operation is one implementation of the larger class of updates that replace x with an updated value that is a function of x and $\overline{A}$. Note that each iterative step of the exemplary algorithm of module 408 does not require a new $\overline{A}$; moreover, due to the overhead involved in the calculation of $\overline{A}$, it is common to apply a rule of thumb derived from general experience, experience with a given domain of problems or experience gained from a particular problem. For example, in an exemplary implementation of the module 408, recalculation of $\overline{A}$ may be performed every fourth iteration. In most cases, no recalculation of $\overline{A}$ is indicated where a rate of progress toward a solution to the linear system is satisfactory.

A first example of an algorithm, which may be implemented by Perceptron module 410, is adapted from a domain of problems which includes, but is not limited to, linear systems. As seen below, the "method of steepest descent" may be adapted in an innovative manner for use in solving linear programs. For example, a matrix D may be set equal to either $\overline{A}$ or $\overline{A}^T\overline{A}$; as determined by the needs of the application, through minimal experimentation. In each iteration, x is set equal to $x-(Dx)^T(Dx)(Dx)/((Dx)^T D(Dx))$. As seen above, a new value for $\overline{A}$ (and, therefore, a new value for D) is typically not obtained for every iteration, and is typically not obtained where progress toward the solution to the linear system is satisfactory.

In a second example utilizing an algorithm from an unrelated domain of mathematical topics for application to linear systems, the "Lanczos method" may be adapted for use in Perceptron module 410. To implement this algorithm for use in finding solutions to linear equations, a matrix D may be formed as seen above. In one version of the Lanczos method, at each iteration x is set equal to $(D-x^T Dx/x^T x)x/\|x\|-x_{prev}$, where $x_{prev}$ denotes the x from the previous iteration. In an alternative version of the Lanczos method, at each iteration x is set equal to $Dx-(x^T Dx)x$.

In a third example utilizing an algorithm from an unrelated domain of mathematical topics for application to linear systems, the "method of conjugate gradients" may be adapted for use in Perceptron module 410. To implement this algorithm for use in finding solutions to linear equations, a matrix D may be formed as seen above and a vector d is initially set equal to Dx. In each iteration, x' is set equal to $x-(Dx)^T(Dx)d/(d^T Dd)$. The vector d is set equal to $(Dx')+(Dx')^T(Dx')/((Dx)^T(Dx))$ d. The vector x is then set equal to x'.

Continuing to refer to FIG. 4, Perceptron functional module 412 is configured to select an improved solution to a linear program where the program was reformulated by the reformulation module 104 in the $y^T \overline{A}=0$, $y \geq 0$, $y_0>0$ form. The Perceptron functional module 412 is configured to maintain $y^T A=p$, where p is a vector in a second state and where the first state includes modules 102–110. The module 412 chooses $a_i$ to minimize $a^T_i p$, where $a_i$ are normalized constraints within the linear program. The $a_i$ may be selected as seen in modules 402–406. For example, $a_i$ may be selected based on a determination of the likelihood that the $a_i$ will be negative, as seen in Perceptron functional module 406. Where $a^T p<0$ then, a number of variables are set. First, y' is set equal to $y-(p^T a_i)e_i$, where $e_i$ denotes a vector that is 1 in the $i^{th}$ coordinate and zero elsewhere. Additionally, p is set equal to $(p-(p^T a_i)a_i)/\|y'\|$, and finally y is set equal to $y'/\|y'\|$.

Note that, where v is a vector and c is a scalar, the replacement of v by cv may be accomplished by annotating v with a single extra number. Accordingly, less processor time is required than if each element in v was multiplied by c.

Referring again to FIG. 1, switching and stopping module 110 is configured to allow alternation between applying a Perceptron, Perceptron-type or related algorithm defined within the Perceptron module 108 and applying the transform algorithm of the transformation module 112. In an exemplary application, the switching and stopping module 110 is configured to transfer control to the perceptron module 108 when progress toward the solution to the linear program is sufficiently rapid, and to transfer control to the transform algorithm 112 when the rate of progress is insufficient.

In one implementation, the switching and stopping module 110 may be configured to evaluate variables σ and σ', wherein $\sigma=-\min_i(a^T_i x)/(\|a_i\| \|x\|)$ and $\sigma'=-\min_i(a^T_i x)/(\|\overline{a}_i\| \|Bx\|)$, wherein $\min_i$ evaluates the terms which follow for all i and selects the minimum value, and where B is a measure of changes made by the transform algorithm and may be implicitly represented by a vector, a low-rank matrix or a full-rank matrix. To the extent that any of these calculations have already been done by the other modules, they do not need to be redone. During operation of the switching and stopping module 110, σ' is compared to scalars $\sigma_{stopping}$. Where σ' is less than $\sigma_{stopping}$ the solution to the linear program is consider satisfactory and control is transferred to the transformation undoing module 114. Where σ' is not less than $\sigma_{stopping}$, the solution to the linear program is not yet consider satisfactory, and work is continued to produce a better solution. Where work must continue to produce a better solution, the switching and stopping module 110 compares σ to $\sigma_{scale\ in}$ to determine if a transform step or a Perceptron step is indicated. Where σ is less than $\sigma_{scale\ in}$, control is transferred to the transform module 112; after the application of the transform module 112, σ has the value $\sigma_{scale\ out}$. Where σ is not less than $\sigma_{scale\ in}$, control is transferred to the Perceptron module 108 for an additional iteration.

Accordingly, the scalar $\sigma_{stopping}$ determines the accuracy demanded in the final value of x. The scalar $\sigma_{scale\ in}$ determines how long the Perceptron module 108 operates before the transformation module 112 is invoked, and will always be less than $\sigma_{scale\ out}$. The scalar $\sigma_{scale\ out}$ determines how hard the transform step is pushed (i.e. the extent to which the vector space containing A and x is dilated).

A number of switching and stopping criteria may be employed, each of which selects between continued application of the perceptron algorithm of the Perceptron module 108, application of the transform module 112 and application of the transformation undoing module 114. Accordingly, the boosted Perceptron system 100 alternates between applying the Perceptron algorithm when progress toward the solution to the linear program is sufficiently rapid and applying the transform algorithm when progress toward a solution is insufficiently rapid, such as when small angles between hyperplanes defining the linear program result in slower progress toward the solution.

Referring again to FIG. 1, a transform module 112 is configured to transform the vector space within which the linear program 200 is defined. In particular, the transform module stretches and squeezes a vector space $R^d$ within which the linear program is defined, thereby altering angles between constraints associated with the linear program. Such an alteration may accelerate progress made to toward the solution of the linear program. For example, in FIG. 5 the constraints 202 and 204 form an acute angle 214. Incremental improvements to reach the solution 216 to the linear program are represented by the ends of line segments 502. Due to the geometry of the acute angle 214, each incremental improvement on the solution results in only slight progress toward an acceptable solution.

Figure 5:
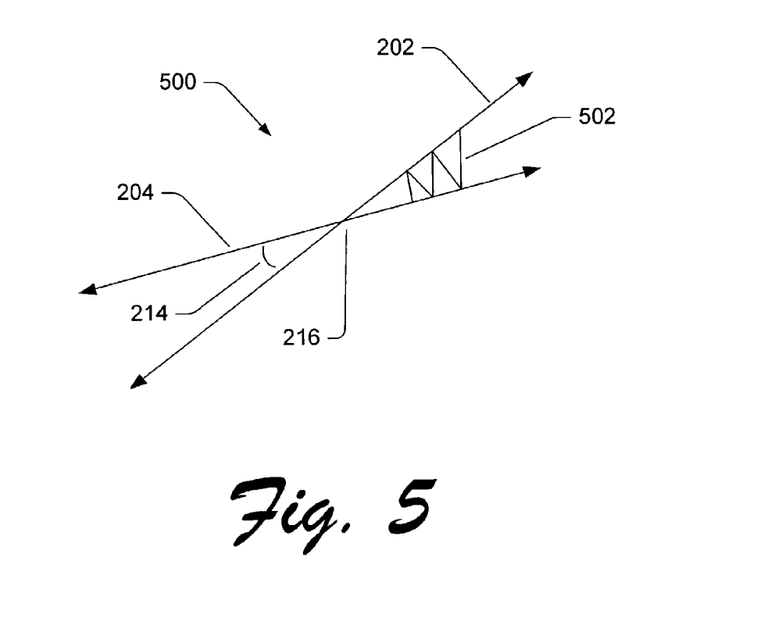
FIG. 5 is an enlarged view of a portion of a linear program, wherein progress toward a solution is slowed due to a small angle between hyperplanes representing two constraints.
Figure 6:
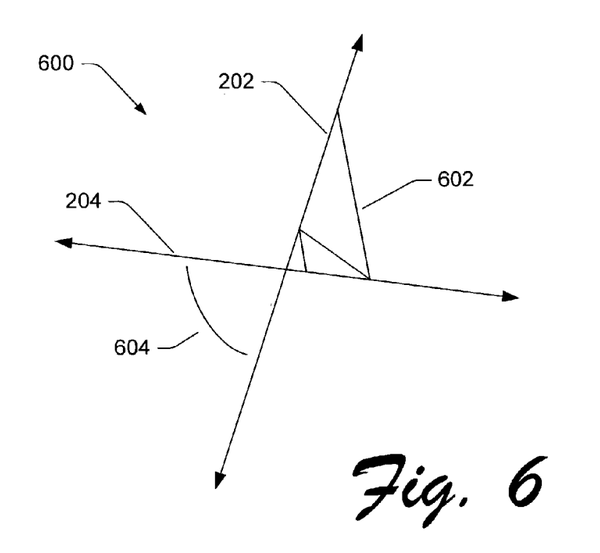
FIG. 6 is an enlarged view of the hyperplanes of FIG. 5 following application of the transformation module.

FIG. 6 represents the vector space of FIG. 5 after a transform has been applied, such as by the transform module 112. The transform increases the small angles between the hyperplanes defining the linear program sufficiently to allow more rapid progress toward the solution. In particular, the measure 604 of the angle 214 is much greater after transformation. Accordingly, after a transform is made the progress made by each sequential improved estimate 602 of the solution is greater.

Figure 7:
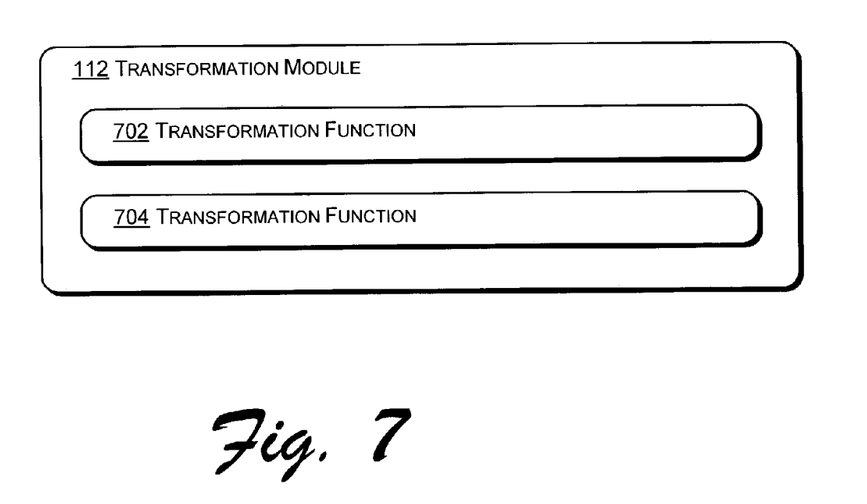
FIG. 7 is a block diagram illustrating in greater detail the elements of the transformation module seen in FIG. 1.

Referring to FIG. 7, two exemplary implementations of transformation functions which may be configured within the transformation module 112 are seen. In a first exemplary implementation 702, the transformation is made by altering matrices A and B. In this implementation, A was originally based on the reformulated linear program. Changes to A result in stretching and squeezing of the vector space within which the linear program is defined. The matrix B is altered to reflect the changes made to the vector space of matrix A, thereby assisting the operation of the transform undoing module 114. The matrix B may be the identity matrix plus a full rank matrix, capable of recording extensive information related to the changes made by the transform algorithm. Alternatively, the matrix B may be the identity matrix plus a low rank matrix, such as $I+x_{scaling} x^T_{scaling}$ and where $x_{scaling}$ is a measure of changes made by the transform algorithm. In a still further alternative, the matrix B may be the identity matrix plus a low rank matrix comprising several vectors. Matrix B, which in one implementation is initially set equal to an identity matrix I, records the transform(s) made. The first exemplary implementation 702 of the transform module 112 is configured to set σ equal to $-\min_i(a^T_i x)/(\|a_i\| \|x\|)$, where $a_i$ are constraints within the linear program; and to set κ equal to $(\sigma_{scale\ out}/\sigma)((1-\sigma^2)/(1-\sigma_{scale\ out}^2))^{0.5}-1$. The matrices A and B are then updated: A is set equal to $A(I+\kappa\ x\ x^T/(x^T x))$ representing the transformed vector space of the linear program, and B is set equal to $B(I+\kappa\ x\ x^T/(x^T x))$ representing a record of the transform applied to A. The value for κ is chosen so that after application of the transformation, the normalized constraints will have changed from possessing a minimum angle σ to possessing a minimum angle $\sigma_{scale\ out}$ with the approximate solution x. This transformation is one implementation of the class of transformations where the transformation is a function of x, $\overline{A}$, and transformations previously applied by the algorithm. The exemplary transformation is drawn from a class of matrix operations known as rank-one updates; however, a rank-one update is only one possibility from the class of low-rank updates which possess similar properties that could be advantageously used in the transformation step.

Continuing to refer to FIG. 7, a second exemplary implementation 704 of the transform module 112 is seen. In this implementation, maintenance of a vector $x_{scaling}$, initially set to zero, may be used to record transforms made. The matrix representation of the transform, denoted by B, is related to $x_{scaling}$ by the equation $B=I+x_{scaling} x^T_{scaling}$. A vector x' is set equal to $(I+x_{scaling} x^T_{scaling})x$. Scalar σ' is set equal to $-\min_i(a^T_i x)/(\|\overline{a}_i\| \|x'\|)$, and scalar κ is set equal to $(\sigma_{scale\ out}/\sigma')((1-\sigma'^2)/(1-\sigma_{scale\ out}^2))^{0.5}-1$, where $\sigma_{scale\ out}$ is a constant selected to influence a degree to which the transform alters the constraints associated with the linear program. The vector $x_{scaling}$ is set to equal $\kappa^{0.5} x'/\|x'\|$, and A is set equal to $\overline{A} B=\overline{A}(I+x_{scaling} x^T_{scaling})$. In this implementation, the transformed A need never be explicitly stored; it is sufficient to store the transforms in $x_{scaling}$, and compute the transformed A from $\overline{A}$ on demand. The value for κ is chosen so that after application of the transformation, the normalized constraints will have changed from possessing a minimum angle σ to possessing a minimum angle $\sigma_{scale\ out}$ with the approximate solution x. This transformation is another implementation of the class of transformations where the transformation is a function of x, $\overline{A}$, and transformations previously applied by the algorithm.

Referring again to FIG. 1, a transform undoing module 114 is configured to undo the transform, or a cumulative transform, which was applied to the vector space within which the linear program is defined, such as by the transform module 112. Control is typically passed to the transform undoing module when the solution to the linear program 114 is considered sufficiently accurate, such as when $(\overline{a}^T_i x)/(\|\overline{a}_i\| \|x\|)$ is sufficiently close to being greater than zero for all i; e.g. when $(\overline{a}^T_i x)/(\|\overline{a}_i\| \|x\|)$ is greater than $-10^{-10}$ for all i. By undoing the transform, the vector x representing a solution to the transformed linear program is adjusted to represent the solution to the linear program before transformation(s) were made.

In some implementations, the transform undoing module 114 has access to the matrix B, representing the cumulative total of the transformation(s) made. In this case, the matrix B may be used to undo the cumulative transformations made to the vector x, wherein the vector x represents an acceptable solution to the linear program, as transformed. Accordingly, Bx represents a solution to the linear program prior to transformation(s), and therefore Bx may be output, where B is a measure of changes made by the transform algorithm.

In other implementations, the transform undoing module 114 may be configured to output $(I+x_{scaling} x^T_{scaling})x=x+(x^T_{scaling} x)x_{scaling}$, where $x_{scaling}$ is a measure of changes made by the transform algorithm. Note that, when evaluating operations in the form of $(M+vv^T)x$, where M is a matrix and v and x are vectors, the boosted Perceptron system 100 may be configured to apply associativity to avoid explicitly evaluating $(M+vv^T)$.

Continuing to refer to FIG. 1, a reformation undo and output module 116 is configured to undo the reformation of the linear program. Thus, while the linear program may have initially been formatted in $\overline{A}x \geq 0$, $x_0 > 0$ form or $y^T \overline{A} = 0$, $y \geq 0$, $y_0 > 0$ form, this format may be undone or reversed to present the output in an expected format.

Although the disclosure has been described in language specific to structural features and/or methodological steps, it is to be understood that the appended claims are not limited to the specific features or steps described. Rather, the specific features and steps are exemplary forms of implementing this disclosure selected from among alternate embodiments. For example, some actions described in blocks of the flow diagrams may be performed in parallel with actions described in other blocks, may occur in an alternate order, or may be distributed in a manner which associates one or more actions with more than one other block. Additionally, while one or more methods have been disclosed by means of flow charts and text associated, it is to be understood that some rearrangement of the functionality contained within each block may be made, and may result in similar advantages. And further, in various blocks of one or more diagrams, one or more alternate methods for achieving a result have been shown. However, these methods are exemplary only, and still further alternate methods could in many cases be substituted, while still in keeping with the teachings of the disclosure.

The invention claimed is:

1. A processor-readable medium comprising processor-executable instructions for allocating physical resources consistent with a solution space of a linear program $\overline{A}$, the processor-executable instructions comprising instructions for:
   determining and maintaining scalar values σ, σ', $\sigma_{scale\ in}$, and $\sigma_{stopping}$; using a Perceptron type algorithm to move a vector x toward the solution space of the linear program $\overline{A}$ by minimizing violation of constraints of the linear program $\overline{A}$;
   deciding, based on truth of $\sigma > \sigma_{scale\ in}$, between continued movement of the vector x towards the solution space and application of a transform algorithm to the linear program $\overline{A}$;
   deciding, based on truth of $\sigma' < \sigma_{stopping}$ if the vector x is in the solution space; and
   undoing the transform algorithm on the vector x.

2. A processor-readable medium as recited in claim 1, wherein the undoing comprises further instructions for:
   applying a reverse of the transform algorithm applied to the linear program $\overline{A}$ to the vector x.

3. The processor-readable medium as recited in claim 2, wherein the Perceptron type algorithm comprises further instructions for:
   choosing $a_i$ to minimize $a^T_i x$, where $a_i$ are normalized constraints within the linear program; and
   setting x equal to $(x-(a^T_i x)a_i)$.

4. The processor-readable medium as recited in claim 2, wherein the Perceptron type algorithm comprises further instructions for:
    selecting $a_i$ based on likelihood that the $a^T_i p$ will be negative, such that where $a^T_i p < 0$:
        y' is set equal to $y-(p^T a_i)e_i$, where $e_i$ denotes a vector that is 1 in the $i^{th}$ coordinate and zero elsewhere;
        p is set equal to $(p-(p^T a_i)a_i)/\|y'\|$; and
        y is set equal to $y'/\|y'\|$; and
    wherein the linear program has been configured in $y^T \overline{A}=0$, $y \geq 0$, $y_0 > 0$.

5. The processor-readable medium as recited in claim 1, wherein the moving comprises further instructions for:
    forming a matrix $\overline{A}$ using as rows $a_i$ such that $A^T_i x < 0$ implies that $a_i$ is a violated constraint; and
    setting x equal to a function of x and $\overline{A}$.

6. The processor-readable medium as recited in claim 1, wherein the moving comprises further instructions for:
    setting x so as to minimize the sum of squared magnitudes of the violations of the constraints.

7. A processor-readable medium as recited in claim 1, wherein the Perceptron type algorithm comprises a version of a steepest descent algorithm.

8. A processor-readable medium as recited in claim 7, wherein the version of the steepest descent algorithm comprises further instructions for:
    setting a matrix D equal to $\overline{A}$ or $\overline{A}^T \overline{A}$ and setting x equal to $x-(Dx)^T(Dx)(Dx)/((Dx)^T D(Dx))$.

9. A processor-readable medium as recited in claim 1, wherein the Perceptron type algorithm comprises a version of Lanczos' method.

10. A processor-readable medium as recited in claim 9, wherein the version of Lanczos' method comprises further instructions for:
    setting a matrix D equal to $\overline{A}$ or $\overline{A}^T \overline{A}$ and setting x equal to $(D-x^T Dx/x^T x)x/\|x\| - x_{prev}$, where $x_{prev}$ denotes the x from the previous iteration.

11. The processor-readable medium as recited in claim 9, wherein the version of Lanczos' method comprises further instructions for:
    forming a matrix $\overline{A}$ using as rows a such that $a^T_i x < 0$ implying that $a_i$ is a violated constraint; and
    setting x equal to $((\overline{A}^T \overline{A})x - (x^T \overline{A}^T \overline{A}x)x)$.

12. A processor-readable medium as recited in claim 1, wherein the Perceptron type algorithm comprises a version of a conjugate gradients algorithm.

13. A processor-readable medium as recited in claim 12, wherein the version of a conjugate gradients algorithm comprises further instructions for:
    setting a matrix D equal to $\overline{A}$ or $\overline{A}^T \overline{A}$;
    initially setting a vector d to Dx;
    in each iteration, setting x' is set equal to $x-(Dx)^T(Dx)d/(d^T Dd)$;
    setting d equal to $(Dx')+(Dx')_T(Dx')/((Dx)^T(Dx))d$; and
    setting x equal to x'.

14. A processor-readable medium as recited in claim 1, wherein the deciding comprises further instructions for:
    applying the transform algorithm when progress to the solution has slowed.

15. A processor-readable medium as recited in claim 1, wherein the deciding comprises further instructions for:
    applying the transform algorithm when an angle between two hyperplanes within a vector space defined by the linear program is less than a threshold value.

16. A processor-readable medium as recited in claim 1, wherein the deciding comprises further instructions for:

where $\sigma = -\min_i(a^T_i x)/(\|a_i\| \|x\|)$, applying the transform algorithm when $\sigma$ is less than $\sigma_{scale\ in}$.

17. A processor-readable medium as recited in claim 16, wherein the application of the transform algorithm alters angles between constraints associated with the linear program by stretching and squeezing a vector space $R^d$ within which the linear program is defined.

18. A processor-readable medium as recited in claim 17, wherein the application of the transform algorithm updates A as a function of x and $\overline{A}$.

19. A processor-readable medium as recited in claim 1, wherein applying the transform algorithm increases angles between hyperplanes defining the linear program sufficiently to allow more rapid progress toward the solution.

20. A processor-readable medium as recited in claim 1, comprising further instructions for:
    reformulating the linear program into $\overline{A}x \geq 0$, $x_0 > 0$ form, to include m constraints in d dimensions, where $x \in R^d$ and $\overline{A}$ is m by d and constraints of the linear program are defined by rows $\overline{a}_i$ of $\overline{A}$.

21. A processor-readable medium as recited in claim 1, comprising further instructions for:
    reformulating the linear program into $y^T \overline{A}=0$, $y \geq 0$, $y_0 > 0$ form.

22. The processor-readable medium as recited in claim 1, wherein undoing the transform algorithm on the vector x maps the vector x into a solution to the linear program.

23. A processor-readable medium as recited in claim 1, comprising further instructions for:
    undoing the transform algorithm on the vector x to result in an approximate solution.

24. A processor-readable medium as recited in claim 1, wherein the deciding between continued movement comprises further instructions for:
    setting $\sigma' = -\min_i(a^T_i x)/(\|\overline{a}_i\| \|Bx\|)$,
    undoing the transform algorithm when $\sigma' < \sigma_{stopping}$;
    applying the transform algorithm when $\sigma$ is less than $\sigma_{scale\ in}$;
    applying a Perceptron step when $\sigma$ is greater than $\sigma_{scale\ in}$;
    wherein $\sigma_{stopping}$ is selected to result in an arbitrarily satisfactory solution and $\sigma_{scale\ in}$ is selected to balance progress made by the perceptron algorithm with overhead resulting from the transform algorithm.

25. The processor-readable medium as recited in claim 1, wherein applying the transform algorithm comprises further instructions for:
    maintaining a vector $x_{scaling}$, initially set to zero, to record transforms made;
    setting x' equal to $(I + x_{scaling} x^T_{scaling})x$;
    setting $\sigma'$ equal to $-\min_i(a^T_i x)/(\|\overline{a}_i\| \|x'\|)$, where $a_i$ are constraints within the linear program;
    setting $\kappa$ equal to $(\sigma_{scale\ out}/\sigma')((1-\sigma'^2)/(1-\sigma_{scale\ out}^2))^{0.5} - 1$, where $\sigma_{scale\ out}$ is a constant selected to influence a degree to which the transform alters the constraints associated with the linear program;
    setting $x_{scaling}$ equal to $\kappa^{0.5} x'/\|x'\|$; and
    setting $a_i$ equal to $(I + x_{scaling} x^T_{scaling})\overline{a}_i$.

26. The processor-readable medium as recited in claim 1, wherein applying the transform algorithm comprises further instructions for:
    setting $\sigma$ equal to $-\min_i(a_{Ti} x)/(\|a_i\| \|x\|)$, where $a_i$ are constraints within the linear program;
    setting $\kappa$ equal to $(\sigma_{scale\ out}/\sigma)((1-\sigma^2)/(1-\sigma_{scale\ out}^2))^{0.5} - 1$;
    setting A equal to $A(I + \kappa xx^T/(x^T x))$, where A is initially based on the constraints of the linear program; and
    setting B equal to $B(I + \kappa xx^T/(x^T x))$, where B is initially I.

27. The processor-readable medium as recited in claim 1, comprising further instructions for applying associativity when evaluating operations in formed as $(M+vv^T)x$, where M is a matrix and v and x are vectors to avoid explicitly evaluating $(M+vv^T)$.

28. The processor-readable medium as recited in claim 1, comprising further instructions for:
reformulating an initial linear program into a form selected from a group of forms, comprising:
an $\overline{A}x \geq 0$, $x_0 > 0$ form; and
a $y^T \overline{A} = 0$, $y \geq 0$, $y_0 > 0$ form;
alternating between applying a perceptron algorithm when progress toward the solution to the linear program is sufficiently rapid and applying the transform algorithm when small angles between hyperplanes defining the linear program result in insufficiently rapid progress toward the solution, wherein applying the transform algorithm alters angles between constraints associated with the linear program by stretching and squeezing a vector space $R^d$ within which the linear program is defined, such that the small angles between the hyperplanes defining the linear program are increased sufficiently to allow more rapid progress toward the solution;
wherein the transform algorithm is selected from a group of algorithms comprising:
a first algorithm, comprising instructions for:
setting $\sigma$ equal to $-\min_i(a^T_i x)/(\|a_i\| \|x\|)$, where $a_i$ are constraints within the linear program;
setting $\kappa$ equal to $(\sigma_{scale\ out}/\sigma)((1-\sigma^2)/(1-\sigma_{scale\ out}^2))^{0.5}-1$;
setting A equal to $A(I+\kappa xx^T/(x^T x))$ where A is initially based on the constraints of the linear program; and
setting B equal to $B(I+\kappa xx^T/(x^T x))$ where B is initially I; and
a second algorithm, comprising instructions for:
maintaining a vector $x_{scaling}$, initially set to zero, to record transforms made;
setting x' equal to $(I+x_{scaling}x^T_{scaling})x$;
setting $\sigma'$ equal to $-\min_i(a^T_i x)/(\|\overline{a}_i\| \|x'\|)$, where $a_i$ are constraints within the linear program;
setting $\kappa$ equal to $(\sigma_{scale\ out}/\sigma')((1-\sigma'^2)/(1-\sigma_{scale\ out}^2))^{0.5}-1$, where $\sigma_{scale\ out}$ is a constant selected to influence a degree to which the transform alters the constraints associated with the linear program;
setting $x_{scaling}$ equal to $\kappa^{0.5} x'/\|x'\|$; and
setting $a_i$ equal to $(I+x_{scaling}x^T_{scaling})\overline{a}_i$; and
undoing the transform algorithm on the vector x to result in an approximate solution.

29. A system for allocating physical resources according to a solution space of a linear program, comprising:
means for determining and maintaining scalar values $\sigma$, $\sigma'$, $\sigma_{scale\ in}$, and $\sigma_{stopping}$;
means for finding an improved solution to a linear program using a Perceptron type algorithm;
means for deciding, based on truth of $\sigma > \sigma_{scale\ in}$, between continued movement of a vector x towards the solution space and application of a transform algorithm to the linear program $\overline{A}$;
means for deciding, based on truth of the relationship $\sigma' < \sigma_{stopping}$ if the vector x is in the solution space; and
means for, upon discovery of a satisfactory solution, applying a reverse of the transform algorithm to the satisfactory solution.

30. The system of claim 29, additionally comprising:
means for reformulating an initial linear program into a format expected by the means for finding an improved solution.

31. The system of claim 29, wherein the means for finding improved solution comprises:
means for applying a Perceptron step to an approximate solution to the linear program.

32. The system of claim 29, wherein the Perceptron type algorithm comprises a steepest descent algorithm.

33. The system of claim 32, wherein the means for using the steepest descent algorithm comprises:
means for setting a matrix D equal to $\overline{A}$ or $\overline{A}^T \overline{A}$ and setting x equal to $x-(Dx)^T(Dx)(Dx)/((Dx)^T D(Dx))$.

34. The system of claim 29, wherein the Perceptron type algorithm comprises a version of Lanczos' method.

35. The system of claim 34, wherein the means for using a version of a Lanczos' method comprises:
means for setting a matrix D equal to $\overline{A}$ or $\overline{A}^T \overline{A}$ and setting x equal to $(D-x^T Dx/x^T x)x/\|x\|-x_{prev}$, where $x_{prev}$ denotes the x from the previous iteration.

36. The system of claim 29, wherein the Perceptron type algorithm comprises a version of conjugate gradients.

37. The system of claim 36, wherein the means for using a version of conjugate gradients comprises:
means for setting a matrix D equal to $\overline{A}$ or $\overline{A}^T \overline{A}$;
means for initially setting a vector d to Dx;
means for in each iteration, setting x' is set equal to $x -(Dx)^T(Dx)d/(d^T Dd)$;
means for setting d equal to $(Dx')+(Dx')^T(Dx')/(Dx)^T(Dx))d$; and
means for setting x equal to x'.

38. The system of claim 29, wherein the means for finding an improved solution comprises:
means for updating x where the updated value for x is a function of x and $\overline{A}$.

39. The system of claim 29, wherein the means for applying the transform comprises:
means for increasing an angle between a first and a second hyperplane within a vector space within which the linear program is defined.

40. The system of claim 29, wherein the means for applying the transform comprises:
means for updating the linear program $\overline{A}$ where the update applied to $\overline{A}$ is a function of x and $\overline{A}$.

41. The system of claim 29, wherein the means for applying the transform algorithm comprises:
means for maintaining a vector $x_{scaling}$, initially set to zero, to record transforms made;
means for setting x' equal to $(I+x_{scaling}x^T_{scaling})x$;
means for setting $\sigma$ equal to $-\min_i(a^T_i x)/(\|\overline{a}_i\| \|x'\|)$, where $a_i$ are constraints within the linear program;
means for setting $\kappa$ equal to $(\sigma_{scale\ out}\sigma')((1-\sigma'^2)/(1-\sigma_{scale\ out}^2))^{0.5}-1$, where $\sigma_{scale\ out}$ is a constant selected to influence a degree to which the transform alters the constraints associated with the linear program;
means for setting $x_{scaling}$ equal to $\kappa^{0.5} x'/\|x'\|$; and
means for setting $a_i$ equal to $(I+x_{scaling}x^T_{scaling})\overline{a}_i$.

42. The system of claim 29, wherein the means for applying the transform algorithm comprises:
means for setting $\sigma$ equal to $-\min_i(a^T_i x)/(\|\overline{a}_i\| \|x\|)$, where $a_i$ are constraints within the linear program;
means for setting $\kappa$ equal to $(\sigma_{scale\ out}/\sigma)((1-\sigma^2)/(1-\sigma_{scale\ out}^2))^{0.5}-1$;

means for setting A equal to $A(I+\kappa xx^T/(x^Tx))$, where A is initially based on the constraints of the linear program; and means for setting B equal to $B(I+\kappa xx^T/(x^Tx))$, where B is initially I.

43. A method for allocating physical resources consistent with a solution space to a linear program, comprising:

determining and maintaining scalar values $\sigma$, $\sigma'$, $\sigma_{scale\ in}$, and $\sigma_{stopping}$;

finding an improved solution to the linear program using a Perceptron type algorithm;

applying a transform algorithm to the linear program at least one time, between iterations of the Perceptron type algorithm, when progress solving the linear program is insufficiently rapid, as indicated by truth of $\sigma < \sigma_{scale\ in}$; and where the vector x is within the solution space as indicated by $\sigma' < \sigma_{stopping}$, undoing effects of the transform algorithm on the vector x.

44. The method of claim 43, additionally comprising:

reformulating an initial linear program into a format expected by the algorithm; and allocating the resources according to the solution to the linear program.

45. The method of claim 43, wherein undoing the effects of the transform algorithm comprises:

applying a reverse of the transforms applied to the linear program to the satisfactory solution.

46. The method of claim 43, wherein the Perceptron type algorithm comprises a version of a steepest descent algorithm.

47. The method of claim 46, wherein using the version of the steepest descent algorithm comprises:

setting a matrix D equal to $\overline{A}$ or $\overline{A}^T\overline{A}$ and setting x equal to $x-(Dx)^T(Dx)(Dx)/((Dx)^TD(Dx))$.

48. The method of claim 43, wherein the Perceptron type algorithm comprises a version of Lanczos' method.

49. The method of claim 48, wherein using the version of Lanczos' method comprises:

setting a matrix D equal to $\overline{A}$ or $\overline{A}^T\overline{A}$ and setting x equal to $(D-x^TDx/x^Tx)x/\|x\|-x_{prev}$, where $x_{prev}$ denotes the x from the previous iteration.

50. The method of claim 43, wherein the Perceptron type algorithm comprises a version of conjugate gradients.

51. The method of claim 50, wherein using the version of conjugate gradients comprises:

setting a matrix D equal to $\overline{A}$ or $\overline{A}^T\overline{A}$;

initially setting a vector d to Dx;

in each iteration, setting x' is set equal to $x-(Dx)^T(Dx)d/(d^TDd)$;

setting d equal to $(Dx')+(Dx')^T(Dx')/((Dx)^T(Dx))d$; and setting x equal to x'.

52. The method of claim 43, wherein finding an improved solution comprises:

updating x to a new value that is a function of x and $\overline{A}$.

53. The method of claim 43, wherein applying the transform algorithm comprises:

means for increasing an angle between a first and a second hyperplane within a vector space within which the linear program is defined.

54. The method of claim 43, wherein applying the transform algorithm comprises:

means for updating the linear program $\overline{A}$ to an updated value that is a function of $\overline{A}$ and x.

55. The method of claim 43, wherein updating A comprises:

means for storing the update to A separately from A, so that the new value of A can be recomputed, wherein A is the linear program.

56. The method of claim 43, wherein applying the transform algorithm comprises:

maintaining a vector $x_{scaling}$, initially set to zero, to record transforms made; setting x' equal to $(I+x_{scaling}x^T_{scaling})x$;

setting $\sigma'$ equal to $-\min_i(a^T_i x)/(\|\overline{a}_i\|\ \|x'\|)$, where $a_i$ are constraints within the linear program;

setting $\kappa$ equal to $(\sigma_{scale\ out}/\sigma')((1-\sigma'^2)/(1-\sigma_{scale\ out}^2))^{0.5}-1$, where $\sigma_{scale\ out}$ is a constant selected to influence a degree to which the transform alters the constraints associated with the linear program;

setting $x_{scaling}$ equal to $\kappa^{0.5}x'/\|x'\|$; and setting $a_i$ equal to $(I+x_{scaling}x^T_{scaling})\overline{a}_i$.

57. The method of claim 43, wherein applying the transform algorithm comprises:

setting $\sigma$ equal to $-\min_i(a^T_i x)/(\|a_i\|\ \|x\|)$, where $a_i$ are constraints within the linear program;

setting $\kappa$ equal to $(\sigma_{scale\ out}/\sigma)((1-\sigma^2)/(1-\sigma_{scale\ out}^2))^{0.5}-1$;

setting A equal to $A(I+\kappa xx^T/(x^Tx))$, where A is initially based on the constraints of the linear program; and setting B equal to $B(I+\kappa xx^T/(x^Tx))$, where B is initially I.

58. A system to allocate physical resources consistent with a solution space of a linear program, comprising:

a perceptron module to move toward a solution space to the linear program using a perceptron type algorithm;

a transform module to apply a transform algorithm to alter angles between constraints associated with the linear program;

a switching module to decide between continued application of the perceptron type algorithm and applying the transform algorithm, wherein $\sigma < \sigma_{scale\ in}$ indicates transforming;

a stopping module to decide if the vector x is within the solution space, wherein $\sigma' < \sigma_{stopping}$ indicates that x is within the solution space; and an undo transform module, configured for, upon the vector x moving into the solution space, applying a reverse of the transform algorithm to the vector x.

59. The system of claim 58, additionally comprising:

a reformulation module to reformulate an initial linear program into a format expected by the system.

60. The system of claim 58, wherein the stopping module uses a stopping value of that is selected based on a type of data within the linear program.

61. The system of claim 58, wherein the stopping module uses a stopping value of approximately $10^{-10}$.

62. The system of claim 58, additionally comprising: switching and stopping module configurations to undo the transform when $\sigma' < \sigma_{stopping}$;

apply the transform algorithm when $\sigma$ is less than $\sigma_{scale\ in}$;

apply the perceptron algorithm when $\sigma > \sigma_{scale\ in}$; and an initialization module configuration to:

select $\sigma_{stopping}$ to result in an arbitrarily satisfactory solution and select $\sigma_{scale\ in}$ and $\sigma_{scale\ out}$ to balance progress made by the perceptron algorithm with overhead resulting from the transform algorithm.

63. The system of claim 58, wherein the perceptron module is configured to:

choose $a_i$ to minimize $a^T_i x$, where $a_i$ are normalized constraints within the linear program and a vector x representing a solution to the linear program; and set x equal to $(x-(a^T_i x)a_i)$.

64. The system of claim 58, wherein the perceptron module is configured to:

consider all i sequentially, from 1 to m, where $a^T_i x<0$, where m normalized constraints $a_i$ are included within the linear program and a vector x representing a solution to the linear program; and set x equal to $(x-(a^T_i x)a_i)$.

65. A method for allocating physical resources consistent with a solution space of a linear program, comprising:

using a perceptron type algorithm to move a vector x toward a solution to the linear program;

applying the transform algorithm, between applications of the perceptron type algorithm if $\sigma<\sigma_{scale\ in}$, to stretch portions of a vector space within which the linear program is defined;

determining that the vector x is in the solution space using $\sigma'<\sigma_{stopping}$; undoing the transform algorithm on the vector x; and allocating the physical resources according to the vector x.

66. The method as recited in claim 65, additionally comprising:

reformulating a linear program into $\bar{A}x \geq 0$, $x_0>0$ form, to include m constraints in d dimensions, where $x \in R^d$ and $\bar{A}$ is m by d and the constraints are defined by rows $\bar{a}_i$ of $\bar{A}$.

67. The method as recited in claim 65, additionally comprising:

reformulating an initial linear program into $y^T\bar{A}=0$, $y \geq 0$, $y_0>0$ form.

68. The method as recited in claim 65, additionally comprising:

applying the perceptron algorithm when progress toward the satisfactory solution to the linear program is sufficiently rapid; and applying the transform algorithm when small angles between hyperplanes defining the linear program result in insufficiently rapid progress toward the satisfactory solution.

69. The method as recited in claim 65, additionally comprising:

undoing the transform algorithm on a vector x representing a satisfactory solution to the linear program, wherein the undone vector x is the satisfactory solution by which the resources are allocated.

70. The method as recited in claim 65, wherein operation of the perceptron type algorithm comprises:

choosing $a^i$ to minimize $a^T_i x$, where $a^i$ are normalized constraints within the linear program; and setting x equal to $(x-(a^T_i x)a_i)$.

71. The method as recited in claim 65, wherein operation of the perceptron type algorithm comprises:

considering normalized constraints $a_i$ for all i sequentially, from 1 to m, where m constraints are included within the linear program; and where $a^T_i x<0$, setting x equal to $(x-(a^T_i x)a_i)$.

72. The method as recited in claim 65, wherein operation of the perceptron type algorithm comprises:

choosing an $a_i$ based on a determination of a likelihood that the $a_i$ will be negative, where $a_i$ are normalized constraints within the linear program; and where $a^T_i x<0$, setting x equal to $(x-(a^T_i x)a_i)$.

73. The method as recited in claim 72, wherein the determination of the likelihood comprises further instructions for:

associating every normalized constraint $a_i$ with a $p_i$, a non-negative priority;

keeping the p in a randomized priority queue;

returning for each constraint $a_i$ a probability $p_i/(\Sigma p_i)$, where each $p_i$ is initially set to have priority 1; and where priority $p_i$ is not relevant because $a^T_i x/\|x\| > -\sigma_{scale\ in}$, then multiply $p_i$ by $\lambda$, otherwise multiply $p_i$ by $1/\lambda$, for an arbitrarily selected value of $\lambda$.

74. The method as recited in claim 65, wherein applying the transform comprises:

setting a scalar $\sigma$ equal to $-\min_i(a^T_i x)/(\|a_i\|\|x\|)$, where $a_i$ are constraints within the linear program;

setting $\kappa$ equal to $(\sigma_{scale\ out}/\sigma)-1$;

setting A equal to $A(I+\kappa xx^T/(x^T x))$, where A is initially based on the constraints within the linear program; and setting B equal to $B(I+\kappa xx^T/(x^T x))$, where B is initially I.

75. The method as recited in claim 65, wherein applying the transform algorithm comprises:

maintaining a vector $x_{scaling}$, initially set to zero, to record transforms made;

setting x' equal to $(I+x_{scaling}x^T_{scaling})x$;

etting $\sigma'$ equal to $-\min_i(a^T_i x)/(\|\bar{a}_i\|\|x'\|)$, where $a_i$ are constraints within the linear program;

setting $\kappa$ equal to $(\sigma_{scale\ out}/\sigma')((1-\sigma'^2)/(1-\sigma_{scale\ out}^2))^{0.5}-1$, where $\sigma_{scale\ out}$ is a constant selected to influence a degree to which the transform alters the constraints associated with the linear program;

setting $x_{scaling}$ equal to $\kappa^{0.5}x'/\|x'\|$; and setting $a_i$ equal to $(I+x_{scaling}x^T_{scaling})\bar{a}_i$.

76. The method as recited in claim 65, wherein the deciding comprises:

normalizing an approximate solution x by setting x equal to $x/\|x\|$;

setting a scalar $\sigma'$ equal to $-\min_i(a^T_i x)/(\|\bar{a}_i\|\|Bx\|)$, where B is $I+x_{scaling}x^T_{scaling}$ and where $x_{scaling}$ is a measure of changes made by the transform algorithm; and if $\sigma'$ is less than or equal to $\sigma_{stopping}$, then proceeding to undo transforms, if not, then if $\sigma$ is less than or equal to $\sigma_{scale\ in}$, then performing a transform, if not, then returning to the perceptron type algorithm.

77. The method as recited in claim 65, additionally comprising:

outputting Bx, where B is a measure of changes made by the transform algorithm.

78. The method as recited in claim 65, additionally comprising:

outputting $(I+x_{scaling}x^T_{scaling})x=x+(x^T_{scaling}x)x_{scaling}$, where $x_{scaling}$ is a measure of changes made by the transform algorithm.

79. A system for allocating physical resources consistent with a solution space of a linear program, comprising:

means for using a perceptron type algorithm to move a vector x toward the solution space;

means for applying, between iterations of the perceptron type algorithm, when $\sigma<\sigma_{scale\ in}$, a transform algorithm to stretch portions of a vector space within which the linear program is defined; and means for, upon movement of the vector x into the solution space as indicated by $\sigma<\sigma_{stopping}$, undoing the transform algorithm on the vector x.

80. The system of claim 79, additionally comprising:

means for reformulating the linear program into $\bar{A}x \geq 0$, $x_0>0$ form, to include m constraints in d dimensions, where $x \in R^d$ and $\bar{A}$ is m by d and the constraints are defined by rows $\bar{a}_i$ of $\bar{A}$.

81. The system of claim 79, additionally comprising:

means for reformulating the linear program into $y^T\bar{A}=0$, $y \geq 0$, $y_0>0$ form.

82. The system of claim 79, additionally comprising:

means for applying the perceptron type algorithm when progress toward the satisfactory solution to the linear program is sufficiently rapid; and means for applying the transform algorithm when small angles between hyperplanes defining the linear program result in insufficiently rapid progress toward the satisfactory solution.

83. The system of claim 79, wherein the undoing comprises applying a reverse of the transform to the vector x.

* * * * *